(12) United States Patent
Lebkuechner

(10) Patent No.: US 6,869,259 B2
(45) Date of Patent: Mar. 22, 2005

(54) MILLING METHOD

(75) Inventor: Goetz Lebkuechner, Germering (DE)

(73) Assignee: MTU Aero Engines GmbH, Munich (DE)

( * ) Notice: Subject to any disclaimer, the term of this patent is extended or adjusted under 35 U.S.C. 154(b) by 98 days.

(21) Appl. No.: 10/214,465

(22) Filed: Aug. 8, 2002

(65) Prior Publication Data

US 2003/0202854 A1 Oct. 30, 2003

(30) Foreign Application Priority Data

Apr. 27, 2002 (DE) .......................... 102 19 012

(51) Int. Cl.$^7$ .............................. B23C 3/18; B23C 3/28
(52) U.S. Cl. ........................ 409/132; 409/200; 409/191; 409/143; 409/120; 409/177; 409/211; 409/201; 29/889.23; 29/889.6; 29/889.7; 29/557
(58) Field of Search .................... 409/132, 131, 409/191, 143, 200, 199, 74, 65–66, 71, 120–177, 211, 201, 204; 29/889, 889.2, 889.23, 889.6, 889.7, 557, 558

(56) References Cited

U.S. PATENT DOCUMENTS

| | | | | |
|---|---|---|---|---|
| 2,633,776 A | * | 4/1953 | Schenk ........................ 409/132 |
| 4,046,057 A | * | 9/1977 | Imamura ...................... 409/79 |
| 4,260,304 A | * | 4/1981 | Jacobi ......................... 409/132 |
| 4,775,270 A | * | 10/1988 | Katayama et al. ........... 409/132 |
| 5,197,836 A | * | 3/1993 | Crivellin ..................... 409/200 |
| 5,378,091 A | * | 1/1995 | Nakamura ................... 409/132 |
| 5,482,230 A | * | 1/1996 | Bird et al. ................... 244/121 |
| 5,558,475 A | * | 9/1996 | Hakansson et al. ......... 407/54 |
| 5,868,606 A | * | 2/1999 | Martin ........................ 409/132 |
| 6,007,281 A | * | 12/1999 | Eriksson et al. ............. 409/132 |
| 6,077,002 A | | 6/2000 | Lowe |
| 6,122,824 A | * | 9/2000 | Jensen ......................... 409/132 |
| 6,257,810 B1 | * | 7/2001 | Schmitt ....................... 409/66 |
| 6,488,454 B1 | * | 12/2002 | Ahn et al. ................... 409/132 |
| 6,533,508 B1 | * | 3/2003 | Nonaka ....................... 409/132 |
| 2003/0039547 A1 | * | 2/2003 | Bourgy et al. ............... 416/1 |
| 2003/0152432 A1 | * | 8/2003 | Meece et al. ................ 409/132 |

FOREIGN PATENT DOCUMENTS

| | | |
|---|---|---|
| DE | DT 2422948 | 12/1975 |
| JP | 61-44522 A * | 3/1986 |
| JP | 6-206112 A * | 7/1994 |
| JP | 10-6119 A * | 1/1998 |
| JP | 2000-141120 A * | 5/2000 |

OTHER PUBLICATIONS

"Tool and Manufacturing Engineers Handbook", 4$^{th}$ ed., vol. 1, Machining, Society of Manufacturing Engineers, 1983, p. 10–3 through 10–5.*

* cited by examiner

Primary Examiner—Erica Cadugan
(74) Attorney, Agent, or Firm—Crowell & Moring LLP

(57) ABSTRACT

A milling method is provided for the manufacture of components composed of difficult-to-cut materials for turbomachines, aircraft and spacecraft by producing recesses with one or more side walls. An end milling cutter which cuts at the circumference and at the tip and has a tip contour which is rounded towards the circumference is used as the rotating milling tool. In addition to rotation about its axis, the milling tool performs an eccentric orbiting motion about an orbital axis spaced apart from its axis. The opposite senses of rotation lead to downcut milling, and the orbital axis performs a translational advance motion on a straight and/or curved path transversely to its longitudinal direction, with or without a swivelling motion.

28 Claims, 3 Drawing Sheets

MILLING METHOD

This application claims the priority of German application 102 19 012.7, filed Apr. 27, 2002, the disclosure of which is expressly incorporated by reference herein.

BACKGROUND AND SUMMARY OF THE INVENTION

This invention relates to a milling method for the manufacture of components composed of difficult-to-cut materials for turbomachines, aircraft and spacecraft.

A milling method of this kind is known from U.S. Pat. No. 6,077,002. De facto, this patent provides rough machining by so-called full-cut parallel-stroke milling. In this process, a number of laterally offset grooves (rows) are generally milled, the machining of the respectively outermost grooves including the production of the side-wall contours. For this purpose, at least one milling tool which cuts at the tip and at the circumference is used, i.e. an appropriate end milling cutter. Deeper channels, including the multiple lateral groove offset, are machined in a number of feed steps in the longitudinal direction of the milling cutter. The most important area of application for this method are integrally bladed rotor disks, referred to as "blisks" (Bladed Disks), for gas turbines. In the case of the high-strength, difficult-to-cut materials customary for rotors in the construction of gas turbines, the said method has serious disadvantages, such as a low cutting volume per unit time, high tool wear, high costs and thus, ultimately, low economic viability.

Faced with this situation, it is the object of the invention to propose a milling method for difficult-to-cut materials which is clearly superior to the abovementioned method according to all important criteria.

This object is achieved by the claimed features The crucial difference is to be regarded as the fact that, in addition to the centric rotation about its longitudinal centre line, the tool performs an eccentric orbiting motion about a defined orbital axis. The opposite senses of the rotation and the orbiting motion result in downcut milling, which reduces stresses on the tool and the workpiece. Owing to superimposition of a translational advance motion on the eccentric orbiting motion, the path curve of the centre of the tip of the milling cutter corresponds to a cycloid, i.e. to the curve of a point connected firmly to a body rolling on a flat or curved path, it being possible for the radius of the point to be different from the rolling radius. To enable the milling tool to hug non-vertical side walls, i.e. side walls that are not parallel to the orbital axis, in an optimum manner, the axis of the milling tool can be swivelled periodically during each orbit to give a wobbling motion about a defined point on the axis in the region of the tip of the milling cutter, the axis temporarily being parallel to the side wall tangents. With side walls parallel to the orbital axis, this wobbling is not necessary. With the milling strategy according to the invention, it is possible to achieve machining from a solid with finishing parameters, i.e. with a high cutting speed, moderate tool loading, reduced wear and the possibility of a large down feed. The cutting volume per unit time exceeds the known roughing methods many times over, increasing economic viability accordingly.

Preferred refinements of the milling method according to the main claim are reflected in the dependent claims.

BRIEF DESCRIPTION OF THE DRAWINGS

The invention is explained in greater detail below with reference to the drawing, in which, in a simplified form and not to scale.

DESCRIPTION OF THE PREFERRED EMBODIMENTS

Figure 1:
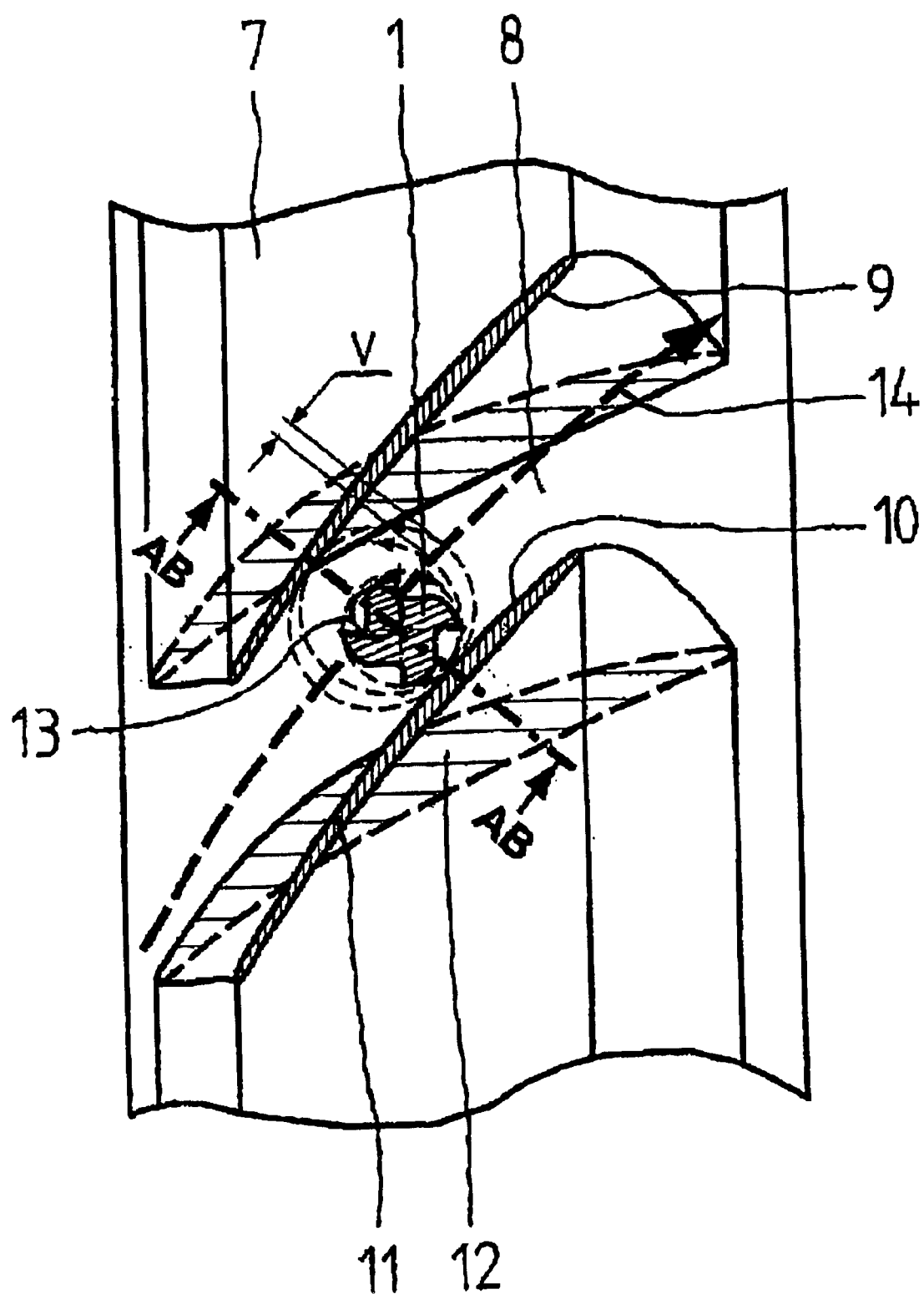
FIG. 1 shows a radial view of a locally machined component in the form of a gas turbine rotor to be provided with integral blades.

The component 7, here, by way of example, in the form of an axial-type gas turbine rotor to be provided with integral blades, is viewed approximately in the longitudinal direction of the milling tool 1 in FIG. 1. In the machining condition illustrated, a recess 8 is first of all produced between two opposite side walls 9, 10. In the final condition, a multiplicity of recesses 8 will be distributed uniformly over the periphery of the component, each separated by an identical number of blades. The recesses 8 then form the flow channels, while the side walls 9, 10 form the pressure and suction faces, respectively, of the blades. To facilitate understanding, blade profiles 11, 12 have been drawn in FIG. 1, 11 being intended to be the profile at the blade tip and 12 the profile at the blade root. It is clear from this that the side faces 9, 10 are three-dimensional surfaces with varying radii of curvature. This is intended to indicate that even very demanding contours can be produced with the milling method according to the invention. This is made possible by the special kinematics, i.e. forms of motion of the milling tool 1, relative to the component 7, it being possible also to move the component. The milling tool 1 in the form of an end milling cutter with a cylindrical outer contour rotates clockwise and centrically about its own axis, as indicated by means of an arrow in FIG. 1. In addition, the milling tool 1 performs an eccentric orbiting motion 13, which is indicated by a circle drawn as a solid line. This orbiting motion 13 is performed anticlockwise, resulting in what is referred to as downcut milling by the milling tool 1. The diameter of the orbiting motion 13 is varied in such a way that the whole width of the recess is covered, if appropriate minus a wall allowance on both sides for a subsequent final machining operation. Another form of motion is a translational advance motion 14 on a straight and/or curved path. The advance v per orbiting motion 13 is indicated by two dashed circles offset in direction 14. During the advance motion 14, the orbital axis of the milling tool 1 can also be swivelled three-dimensionally if required. This is necessary when producing radial compressors and turbines, for example.

Figure 2:
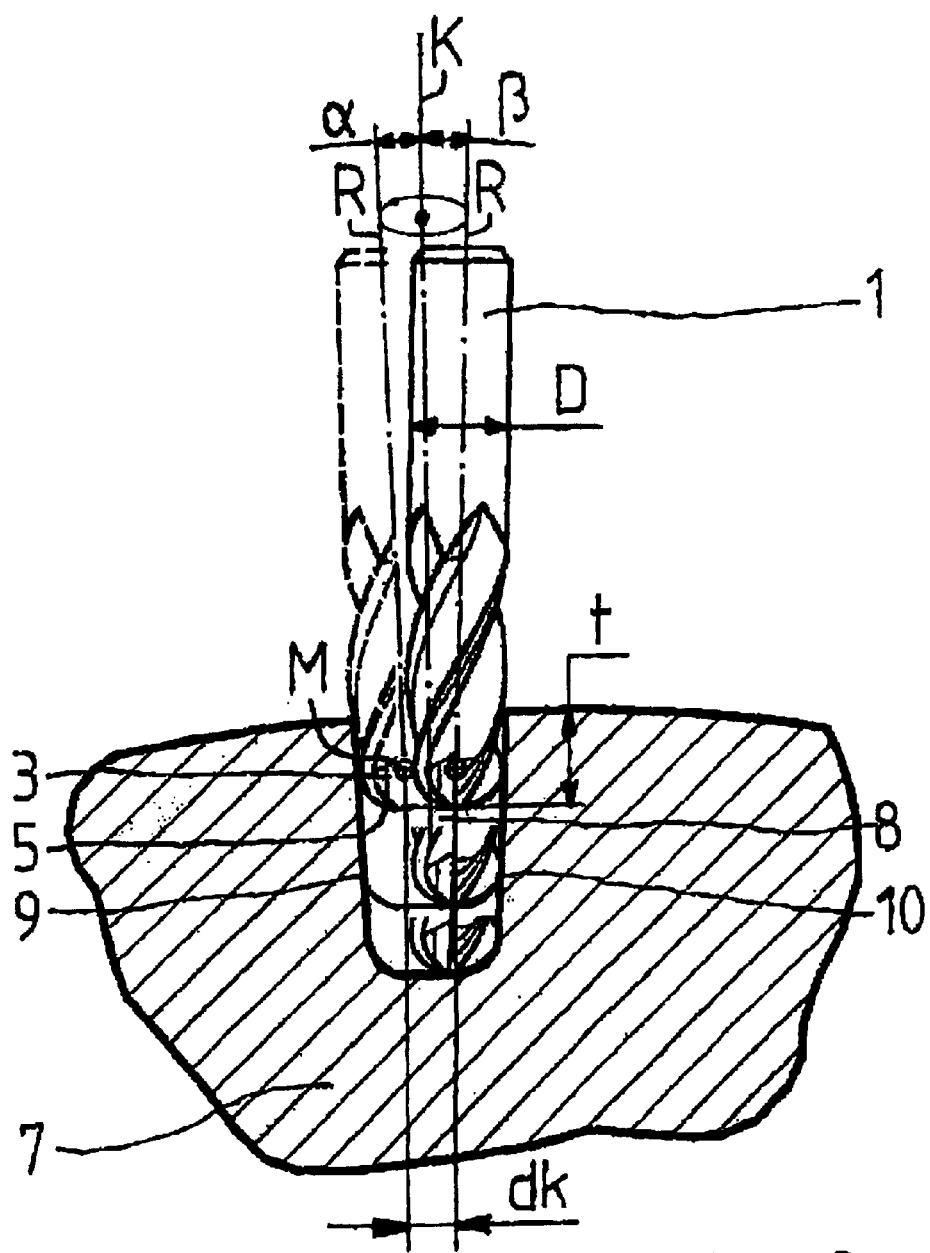
FIG. 2 shows a partial section along the line AB—AB in FIG. 1.

Further details can be seen from FIG. 2. The milling tool 1 in the illustration is a so-called spherical cutter with a hemispherical tip contour 5, the centre of which is denoted by M. The down feed t for an initial machining operation is shown, as are two further feed positions. The maximum possible ratio of the down feed to the milling-tool diameter D should be about 2. FIG. 2 furthermore shows the axis R of the milling tool 1, the orbital axis K of the eccentric motion of the tool and the diameter dk of the orbiting motion, which, to be precise, here applies only to the tip 3 of the milling cutter. Since neither of the side walls 9, 10 of the recess 8 is parallel to the axis K of revolution, i.e. perpendicular to the base of the recess 8, an additional wobbling motion is imposed on the milling tool 1. This takes place periodically during each orbit around the orbital axis K. As the milling tool 1 approaches the side wall 9, its axis R is swivelled through an angle α relative to the centre M and, as it approaches the side wall 10, it is swivelled through an angle β. The angles are chosen in such a way that the circumference of the milling tool machines the respective side wall as close as possible to the contour. The angles α and β can be location-dependent, i.e. vary with the advance, and can also be depth-dependent, i.e., vary with the down feed. In the case of simple recesses with vertical side walls, the said wobbling motion is not necessary. With increasing distance from the tip of the milling cutter in the direction of the shank, the wobbling motion leads to a distortion of the orbiting motion about the axis K in the direction of an ellipse or a similar closed curve. If the side walls to be machined have a constant slope relative to the vertical at all points, it would also be conceivable to make the axis R of the milling tool 1 "wobble" at a constant angle on an imaginary conical surface with the orbital axis K as the axis of the cone.

Figure 3:
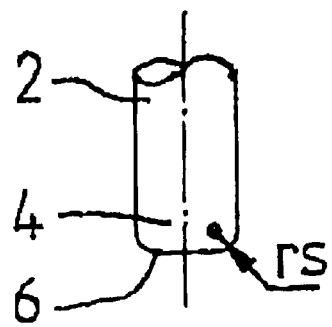
FIG. 3 shows a milling tool with an alternative tip contour.

FIG. 3 shows a milling tool 2 with an alternative tip contour in a highly simplified representation. Instead of a hemisphere—as in FIG. 2—the tip 4 of the milling cutter initially has a flat area 6 around the axis extending at a transition radius rs towards the circumference of the cutter. Fundamentally, the only important point is that there should be no notch-generating angles in the region of the tip of the milling cutter. The exact contour of the tip is to be optimized in each individual case.

Figure 4:
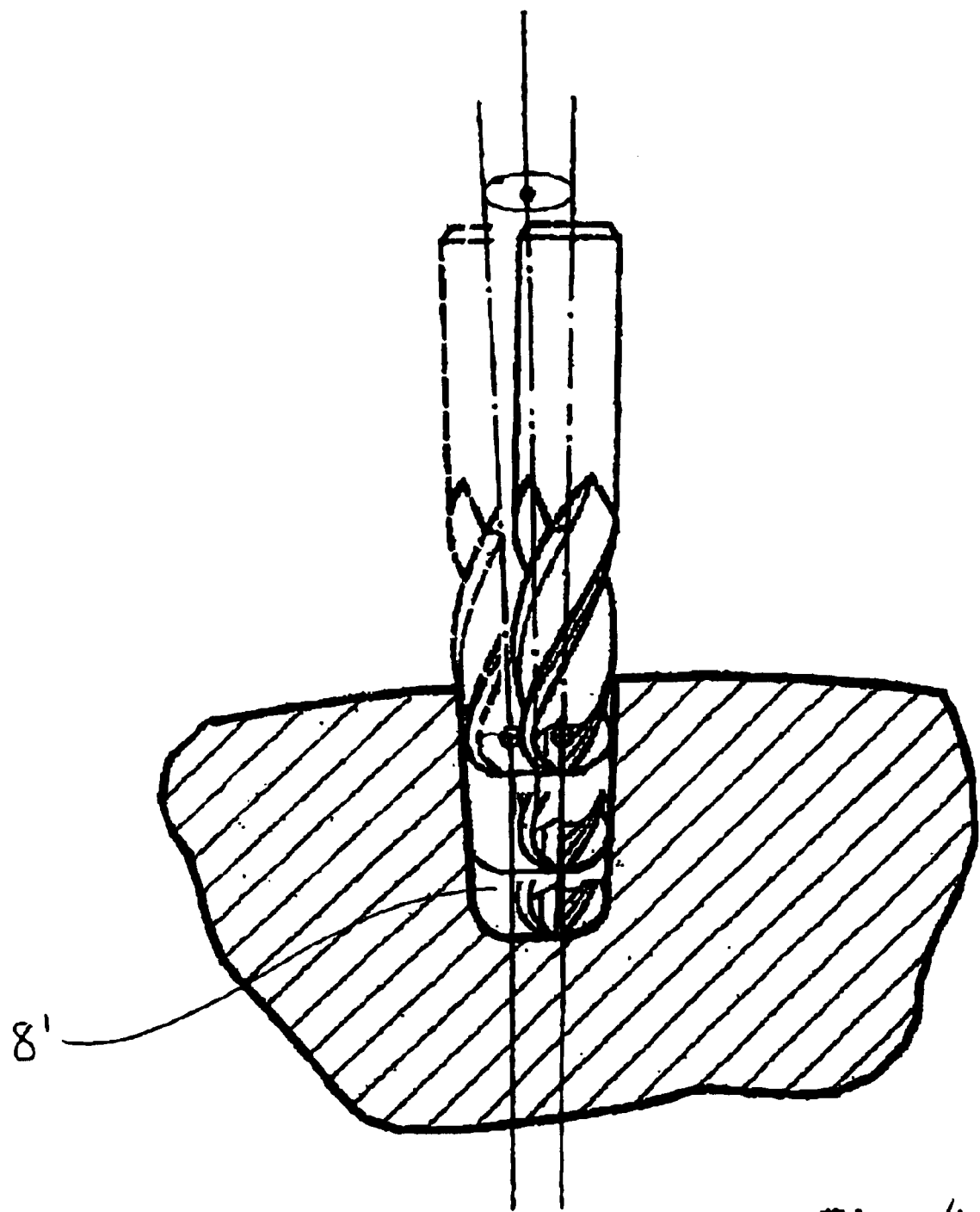
FIG. 4 shows a partial section similar to FIG. 2 but in which the locally machined component is in a form other than that of a gas turbine rotor.

FIG. 4 shows the milling method as it may be used for milling any of pocket-type recesses or interspaces, identified by reference number 8', adjoining flange surfaces, raised portions, and connection stubs on gas turbine housings, or by milling such pocket-type recesses or interspaces 8' on structural elements of aircraft and spacecraft, such as ribs, frames, spars, stringers, and paneling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A milling method for manufacturing components for turbomachines, aircraft and spacecraft by producing recesses or interspaces with one or more side walls, the recesses or interspaces forming channels and the side walls forming surfaces, comprising:
   using an end milling cutter which cuts at its circumference and at its tip and has a tip contour which is rounded at least towards the circumference as a rotating milling tool,
   performing both centric rotation about a milling tool axis and an eccentric orbiting motion about an orbital axis, spaced apart from the milling tool axis, with the milling tool, the sense of the rotation being opposite to the sense of rotation of the orbiting motion, and the speed of rotation being considerably higher than the speed of the orbiting motion,
   performing a translational advance motion with the orbital axis, including the milling tool moving eccentrically around it, on a straight and/or curved path transversely to the longitudinal direction of the orbital axis to thereby produce the recesses or interspaces, and
   periodically wobbling the milling tool as required while performing the eccentric orbiting motion.

2. The milling method according to claim 1, wherein the end milling cutter has a hemispherical tip contour or a tip contour that is flat in the central area of the cutter and, at the edge of the flat tip contour, extends towards the circumference of the cutter with a transition radius.

3. The milling method according to claim 2, wherein, without taking into account a superimposed wobbling motion of the milling tool, the constant or variable diameter of the orbiting motion about the orbital axis corresponds to the local nominal channel width minus a final machining allowance on both sides of the respective channel and minus the diameter of the milling tool.

4. The milling method according to claim 3, wherein, in terms of its parameters, the milling method corresponds to finish-machining.

5. The milling method according to claim 4, wherein a down feed in the direction of the orbital axis between two successive machining steps is no more than about twice the diameter of the milling tool.

6. The milling method according to claim 4, wherein the translational advance is about 0.5 to 1.0 mm per orbiting motion about the orbital axis.

7. The milling method according to claim 6, wherein a down feed in the direction of the orbital axis between two successive machining steps is no more than about twice the diameter of the milling tool.

8. The milling method according to claim 2, wherein, in terms of its parameters, the milling method corresponds to finish-machining.

9. The milling method according to claim 8, wherein a down feed in the direction of the orbital axis between two successive machining steps is no more than about twice the diameter of the milling tool.

10. The milling method according to claim 8, wherein the translational advance is about 0.5 to 1.0 mm per orbiting motion about the orbital axis.

11. The milling method according to claim 10, wherein a down feed in the direction of the orbital axis between two successive machining steps is no more than about twice the diameter of the milling tool.

12. The milling method according to claim 2, wherein the method is used for milling any of pocket-type recesses or interspaces adjoining flange surfaces, raised portions, and connection stubs on gas-turbine housings or on ribs, frames, spars, stringers, paneling or other structural elements of aircraft and spacecraft.

13. The milling method according to claim 1, wherein, without taking into account a superimposed wobbling motion of the milling tool, the constant or variable diameter of the orbiting motion about the orbital axis corresponds to the local nominal channel width minus a final machining allowance on both sides of the respective channel and minus the diameter of the milling tool.

14. The milling method according to claim 13, wherein, in terms of its parameters, the milling method corresponds to finish-machining.

15. The milling method according to claim 14, wherein the translational advance is about 0.5 to 1.0 mm per orbiting motion about the orbital axis.

16. The milling method according to claim 15, wherein a down feed in the direction of the orbital axis between two successive machining steps is no more than about twice the diameter of the milling tool.

17. The milling method according to claim 14, wherein a down feed in the direction of the orbital axis between two successive machining steps is no more than about twice the diameter of the milling tool.

18. The milling method according to claim 13, wherein the method is used for milling any of pocket-type recesses or interspaces adjoining flange surfaces, raised portions, and connection stubs on gas-turbine housings or on ribs, frames, spars, stringers, paneling or other structural elements of aircraft and spacecraft.

19. The milling method according to claim 1, wherein, in terms of its parameters, the milling method corresponds to finish-machining.

20. The milling method according to claim 19, wherein the translational advance is about 0.5 to 1.0 mm per orbiting motion about the orbital axis.

21. The milling method according to claim 20, wherein the method is used for milling any of pocket-type recesses or interspaces adjoining flange surfaces, raised portions, and connection stubs on gas-turbine housings or on ribs, frames, spars, stringers, paneling or other structural elements of aircraft and spacecraft.

22. The milling method according to claim 19, wherein a down feed in the direction of the orbital axis between two successive machining steps is no more than about twice the diameter of the milling tool.

23. The milling method according to claim 22, wherein the method is used for milling any of pocket-type recesses or interspaces adjoining flange surfaces, raised portions, and connection stubs on gas-turbine housings or on ribs, frames, spars, stringers, paneling or other structural elements of aircraft and spacecraft.

24. The milling method according to claim 19, wherein the method is used for milling any of pocket-type recesses or interspaces adjoining flange surfaces, raised portions, and connection stubs on gas-turbine housings or on ribs, frames, spars, stringers, paneling or other structural elements of aircraft and spacecraft.

25. The milling method according to claim 1, wherein the method is used for milling any of pocket-type recesses or interspaces adjoining flange surfaces, raised portions, and connection stubs on gas-turbine housings or on ribs, frames, spars, stringers, paneling or other structural elements of aircraft and spacecraft.

26. The milling method according to claim 1, wherein the recesses or interspaces include recesses forming flow channels.

27. The milling method according to claim 1, wherein the side walls form blade surfaces.

28. A milling method for manufacturing components for turbomachines, aircraft and spacecraft by producing recesses or interspaces with one or more side walls, the recesses or interspaces forming channels and the side walls forming surfaces, comprising:

using an end milling cutter which cuts at its circumference and at its tip and has a tip contour which is rounded at least towards the circumference as a rotating milling tool, performing both centric rotation about a milling tool axis and an eccentric orbiting motion about an orbital axis, spaced apart from the milling tool axis, with the milling tool, the sense of the rotation being opposite to the sense of rotation of the orbiting motion, and the speed of rotation being considerably higher than the speed of the orbiting motion, performing a translational advance motion with the orbital axis, including the milling tool moving eccentrically around it, on a straight and/or curved path transversely to the longitudinal direction of the orbital axis to thereby produce the recesses or interspaces, and swiveling the axis of the milling tool periodically as required about a point in the region of the tip of the milling cutter during the orbiting motion about the orbital axis to produce a wobbling motion with a varying slope of the axis to adapt to non-vertical side walls.

* * * * *